United States Patent
Aviely et al.

(10) Patent No.: US 7,187,697 B1
(45) Date of Patent: Mar. 6, 2007

(54) METHOD AND SYSTEM FOR DELIVERING MPEG VIDEO OVER BURSTY COMMUNICATION CHANNELS

(75) Inventors: Gilat Aviely, Jerusalem (IL); Ran Oz, Modiin (IL); Nery Strasman, Ramat Gan (IL); Guy Dvir, Kiriat Ono (IL); Oded Golan, Tel Aviv (IL)

(73) Assignee: Bigband Networks, Inc., Redwood City, CA (US)

( * ) Notice: Subject to any disclaimer, the term of this patent is extended or adjusted under 35 U.S.C. 154(b) by 909 days.

(21) Appl. No.: 09/839,955

(22) Filed: Apr. 19, 2001

(51) Int. Cl.
*H04J 3/06* (2006.01)

(52) U.S. Cl. ...................................... 370/517
(58) Field of Classification Search ........... 370/516, 370/517, 519
See application file for complete search history.

(56) References Cited

U.S. PATENT DOCUMENTS

| | | | | |
|---|---|---|---|---|
| 5,901,149 A | * | 5/1999 | Itakura et al. | 370/468 |
| 6,111,878 A | * | 8/2000 | Powell | 370/395.62 |
| 6,141,323 A | * | 10/2000 | Rusu et al. | 370/236 |

* cited by examiner

*Primary Examiner*—Huy D. Vu
*Assistant Examiner*—Daniel J. Ryman
(74) *Attorney, Agent, or Firm*—Sonnenschein, Nath & Rosenthal LLP (57) ABSTRACT

A system for compensating for timing violations of time restricted data being transmitted over a bursty communication channel. The system includes a retriever, coupled to a buffer, for retrieving the time restricted data from the buffer, at a retrieval rate, a buffer level monitor, coupled to the buffer, for monitoring the level of time restricted data in the buffer at a monitoring rate and a controller coupled to the buffer level monitor and to the retriever, for setting the retrieval rate and the monitoring rate.

16 Claims, 6 Drawing Sheets

METHOD AND SYSTEM FOR DELIVERING MPEG VIDEO OVER BURSTY COMMUNICATION CHANNELS

FIELD OF THE INVENTION

The present invention relates to communication methods and systems in general, and to methods and systems for transmitting digital video over general data communication lines, in particular.

BACKGROUND OF THE INVENTION

Methods and systems for transmitting digital video over communication lines are known in the art. Compressed digital video is largely becoming the preferred medium to transmit video to viewers everywhere. The Motion Pictures Expert Group (MPEG) specifications are standardized methods for compressing and transmitting video. In general, MPEG is used today for transmitting video over terrestrial, wireless, satellite and cable communication channels and also for storing digital video. The MPEG specification used for transmitting MPEG Video is called MPEG Transport. According to MPEG Transport, the transmitted data is packed in Transport packets, each of a fixed size. This specification was especially designed for specific demands of multimedia, and particularly of video. These demands include strict timing issues.

The importance of timing is apparent in many different aspects. One such aspect is the requirement for synchronizing between audio and video streams at the receiver end. Another, even more important issue is the requirement for the receiver to decode and display data at substantially fixed rates. For example, a television set in the United States is required to present video frames at a rate of 29.97 per second. For these reasons, the receiver requires a buffer in order to regulate the timing of the different presentation units (such as video frames). If the receiver and transmitter clocks operate at different rates, a buffer overflow or underflow may occur at some time. Such a rate deviation shall either cause the receiver to discard and lose data in the case of overflow or to have nothing to present to the viewer in the case of underflow. Both cases are unacceptable. Note that this condition occurs even if the transmitter notifies the receiver what is the stream's bit-rate.

The problem stems from the fact that if the clock rates are different, the transmitter and receiver don't agree on the measurement of time and therefore can't agree on the measurement of rates. The MPEG-Transport specifications allow for a difference of ±30 ppm between any two clocks.

One of the methods, known in the art for operating under these strict conditions utilizes a Phase Locked Loop (PLL) unit, at the receiver end, which constantly attempts to emulate the clock of the transmitter. According to this method, the transmitter transmits timing information to the receiver. The PLL unit at the receiver end attempts to lock the receiver clock to operate in synchronicity with the clock of the transmitter, using timing information (PCR), embedded in the MPEG packets. The MPEG specification provides an example for this architecture. This method imposes a limitation whereby, the timing information sent by the transmitter must arrive at the receiver at exact predefined points in time. A deviation from these exact times (i.e., the communication channel was faster or slower than what it was supposed to have been) is called a jitter. Systems using this method are characterized by a threshold, set for the acceptable jitter level. Usually the smaller the jitter is, the faster the receiver can lock its clock to the transmitter clock. In the case of extremely large jitter, the receiver may be unable to lock to the transmitter clock. In the MPEG Transport specification, the allowable jitter level is no more than 500 nanoseconds.

While MPEG Transport specification enables the synchronization of the receiver, it requires a predictable, preferably fixed, communication link between the transmitter and receiver.

It is noted that MPEG Transport specification does not allow loss of packets. Hence, transmitting MPEG transport over conventional communication systems such as Internet Protocol (IP), requires external adjusting intervention, so as to comply with the above requirements. One such method for adjusting a conventional communication system is by using Real Time Protocol (RTP) over UDP over IP. RTP protocol adds timing information to the transmitted RTP packets. It will be appreciated by those skilled in the art that this method adds significant overhead to the transmitted data and in addition makes the transmitted data complicated and cumbersome. It is noted that the RTP timing information is not necessarily the same as the MPEG timing information, thus complicating the operation of adjusting the clock.

Figure 1:
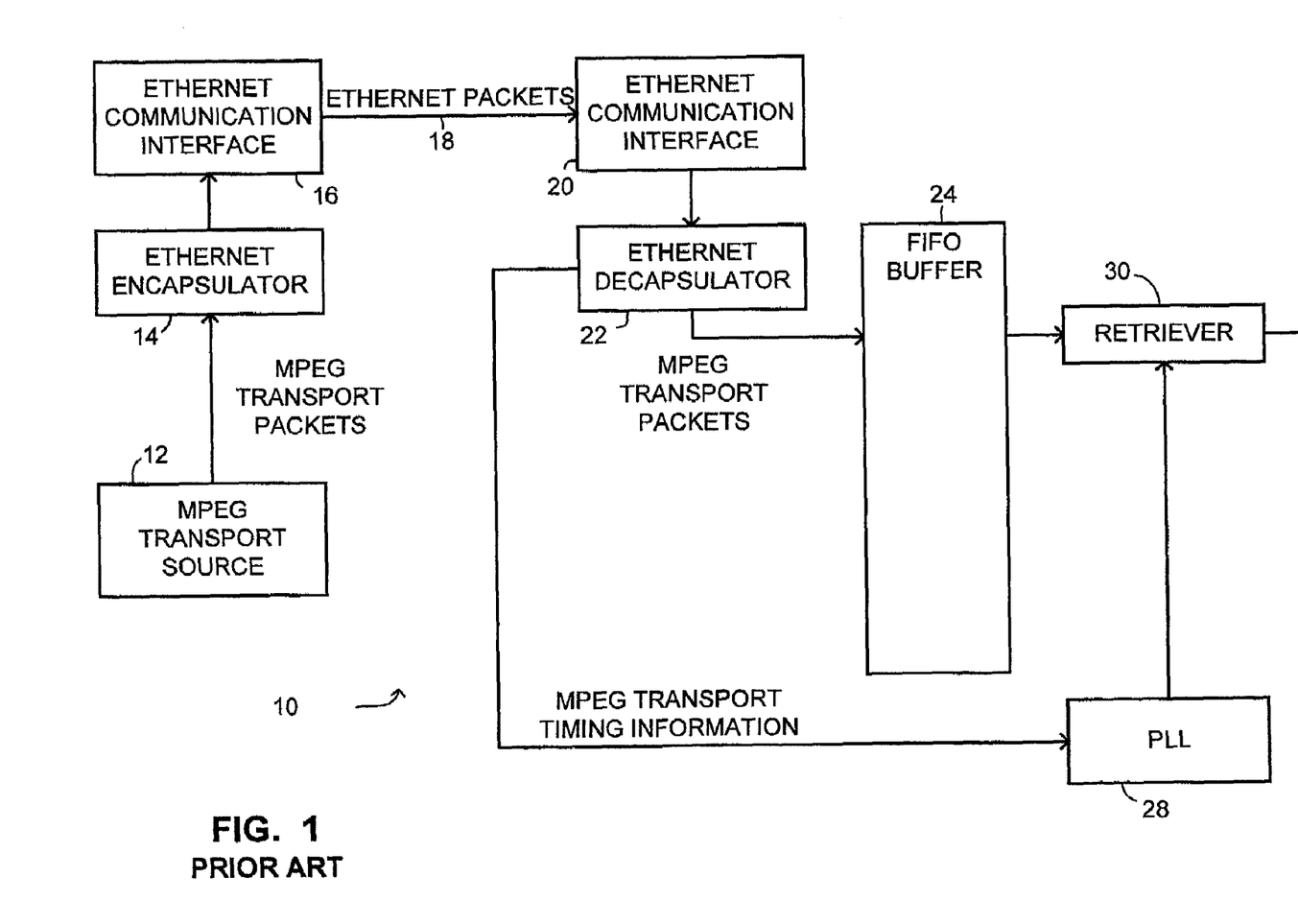
FIG. 1 is a schematic illustration of a system for transmitting MPEG transport data over an Ethernet communication channel, which is known in the art.

Reference is now made to FIG. 1, which is a schematic illustration of a system for transmitting MPEG transport data over an Ethernet communication channel, which is known in the art. System 10 includes an MPEG transport source 12, an Ethernet encapsulator 14, a transmitter end Ethernet communication interface 16, a receiver end Ethernet communication interface 20, an Ethernet decapsulator 22, a first in first out (FIFO) buffer 24, a retriever 30 and a PLL unit 28.

Ethernet encapsulator 14 is connected to MPEG transport source 12 and to transmitter end Ethernet communication interface 16. Ethernet decapsulator 22 is connected to receiver end Ethernet communication interface 20 and FIFO buffer 24. Retriever 30 is connected to FIFO buffer 24 and to PLL unit 28. PLL unit 28 is further connected to Ethernet decapsulator 22. Transmitter end Ethernet communication interface 16 is connected to receiver end Ethernet communication interface 20 via Ethernet communication line 18.

Ethernet encapsulator 14 receives MPEG transport packages from MPEG transport source 12, encapsulates them in Ethernet packets and provides them to transmitter end Ethernet communication interface 16. Transmitter end Ethernet interface 16 transmits the Ethernet packets to receiver end Ethernet communication interface 20 via Ethernet communication line 18. Receiver end Ethernet communication interface 20 provides the received Ethernet packets to Ethernet decapsulator 22, which in turn extracts the MPEG transport packets embedded therein and stores them in FIFO buffer 24. Retriever 30 retrieves MPEG transport packets from FIFO buffer 24 at a rate, which is determined by PLL unit 28. PLL unit 28 keeps FIFO buffer 24 approximately half full by adjusting the output rate in response to changes in buffer fullness, so that the amount of jitter-smoothing achieved depends on the size of the FIFO and the characteristics of the PLL.

System 10 utilizes PLL unit 28 to empty buffer 24. Ethernet decapsulator 22 provides the received timing MPEG Transport packets (i.e., PCR packets) to PLL unit 28, with the exact time that each of these packets has arrived. The arrival times of these PCR packets, being transmitted over an Ethernet communication channel, are likely to exhibit significant jitters over the desired arrival times. It is noted that these large jitters usually cause PLL unit 28 to decrease its performance drastically. For example, when a PLL unit designed for predetermined maximal jitter levels, encounters higher jitter levels, it shall probably malfunction (i.e., the PLL is designed to converge at the predetermined maximal jitter levels and it most probably shall not converge at higher jitter levels).

SUMMARY OF THE PRESENT INVENTION

It is an object of the present invention to provide a novel method and system for delivering MPEG video over bursty communication channels, which overcome the disadvantages of the prior art. In accordance with the present invention, there is thus provided a system for compensating for timing violations of time restricted data being transmitted over a bursty communication channel. The system includes a retriever, a buffer level monitor and a controller. The retriever and the buffer level monitor are connected to a buffer. The controller is connected to the buffer level monitor and to the retriever. The retriever retrieves time restricted data from the buffer at a retrieval rate set by the controller. The buffer level monitor monitors the level of time restricted data in the buffer, at a monitoring rate set by the controller.

In accordance with another aspect of the present invention, there is thus provided a system for transferring time-restricted data over a bursty communication channel. The system includes a log recorder, a buffer level emulator, a controller and a retriever. The buffer level emulator is connected to the log recorder. The controller is connected to the buffer level emulator and the retriever is connected to the controller. The retriever retrieves time restricted data from the buffer, at a retrieval rate set by the controller.

In accordance with a further aspect of the present invention, there is thus provided a system for transferring time-restricted data over the bursty communication channel. The system includes a virtual buffer, a retriever and a processor. The processor is connected to the virtual buffer and to the retriever. The retriever retrieves the time-restricted data from a decapsulator, at a retrieval rate set by the processor.

In accordance with another aspect of the present invention, there is thus provided a method for controlling a buffer, which contains time-restricted data, received over the bursty communication channel. The method includes the steps of detecting if the behavior pattern of the buffer exceeds a given behavior pattern and modifying the retrieval rate of retrieving the time restricted data from the buffer. The step of modifying the retrieval rate is performed by decreasing the retrieval rate when the current level of the time restricted data in the buffer is on the fall, and increasing the retrieval rate when the current level is on the rise.

In accordance with a further aspect of the present invention, there is thus provided a method for controlling a buffer, which contains time-restricted data, received over the bursty communication channel. The method includes the step of setting a time interval between sequential retrievals of time restricted data from a buffer and setting a monitoring time at which the buffer level of the time restricted data in the buffer is to be monitored. The method further includes the step of monitoring the buffer level at the monitoring time. The method further includes the steps of increasing the interval when the buffer level is lower than an upper threshold and decreasing the interval when the buffer level is lower than a lower threshold.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing systems and methods for transmitting and receiving video, over bursty communication channels, which update the receiving-end retrieval rate, according to the bursty nature of the communication channel.

The disclosed technique calculates arrival timing for each received packet, instead of using the actual arrival timing. This new arrival timing is fed to the PLL associated with the MPEG decoder.

The disclosed technique uses the PLL associated with the retriever to provide an virtual MPEG timing information, which complies with MPEG transport restrictions, without having to synchronize the clock of the receiving end with the clock of the transmitting end. This timing information is further used for producing MPEG Transport receiver timing parameters, such as for decoder audio-visual synchronization, and the like. In the following description, the retriever substitutes the packet arrival time, which does not comply with the MPEG transport timing restrictions, with a calculated arrival time, which does. Using the calculated arrival time of each packet enhances the operation and performance of the PLL.

According to another aspect of the invention provides a system for compensating for timing violations of time restricted data being transmitted over a bursty communication channel, the system including: (a) a retriever, coupled to a buffer, for retrieving the time restricted data from the buffer, at a retrieval rate; (b) a buffer level monitor, coupled to the buffer, for monitoring the level of time restricted data in the buffer at a monitoring rate; and (c) a controller coupled to the buffer level monitor and to the retriever, for setting the retrieval rate and the monitoring rate.

Conveniently, the controller sets the retrieval rate and the monitoring rate, according to the level of the time restricted data in the buffer. The retrieval rate is increased when the difference between the level of the time-restricted data in the buffer and a predefined threshold level exceeds a predefined difference threshold. According to an aspect of the invention the retrieval rate being responsive to the difference between the level of the time restricted data in the buffer and a predefined threshold level. According to another aspect of the invention, the retrieval rate and the monitoring rate are responsive to a difference between the buffer behavior pattern to a predefined buffer behavior pattern. According to yet a further aspect of the invention, the retrieval rate and the monitoring rate are responsive to low frequency changes in the level of time restricted data in the buffer. According to yet another aspect of the invention the monitoring rate and the retrieval rate are set in view of a statistical analysis of the level of time restricted data in the buffer.

Conveniently, the controller is configured to change the monitoring rate and the retrieval rate to compensate for jitter included in the time-restricted data. The removal interval is responsive to a current bit rate of the time-restricted data. The controller sets the monitoring rate in response to the level of jitter included in the time restricted data.

Conveniently, the controller is configured to set the monitoring rate in response to changes in the bit rate of arriving time-restricted data. Preferably, the controller modifies the retrieval rate, when said controller detects that the behavior of said current level exceeds a given behavior and adjusts said retrieval rate accordingly.

The invention provides a system for transferring time restricted data over a jitter including channel, the system including: (a) a retriever, coupled to a buffer, for retrieving the time restricted data from the buffer, at a retrieval rate; (b) a buffer level monitor, coupled to the buffer, for monitoring the level of time restricted data in the buffer at a monitoring rate; and (c) a controller coupled to the buffer level monitor and to the retriever, for setting the retrieval rate and the monitoring rate. Conveniently, this system further includes at least one of the following entities: (a1) a decapsulator, connected to said buffer, wherein said decapsulator extracts said time restricted data from bursty channel format packets and wherein said decapsulator provides said time restricted data to said buffer; (a2) a receiving end communication interface, connected to said decapsulator, wherein said receiving end communication interface receives said bursty channel format packets from said bursty communication channel, and wherein said receiving end communication interface provides said bursty channel format packets to said decapsulator; (a3) a transmitting end communication interface, for transmitting said bursty channel format packets to said receiving end communication interface over said bursty communication channel; (a4) an encapsulator, connected to said transmitting end communication interface, for encapsulating said time restricted data in said bursty channel format packets; (a5) a time restricted data source, connected to said encapsulator; (a6) a communication unit, coupled to the retriever. Preferably, the retriever is further connected to a communication unit such as a decoder, for decoding said time restricted data, a transmitter, for transmitting said time restricted data to a remote receiver; and/or a multiplexer, for multiplexing said time restricted data.

The term time restricted data used throughout the description refers to data that is subjected to timing restrictions. Usually the restriction relate to the arrival time of such time-restricted data, at the receiving end. The term bursty communication channel refers to a communication channel, which does not comply with the time restrictions of the time-restricted data. The term bursty communication channel also includes jitter-inducing channels and unpredictable rate communication channel.

Figure 2:
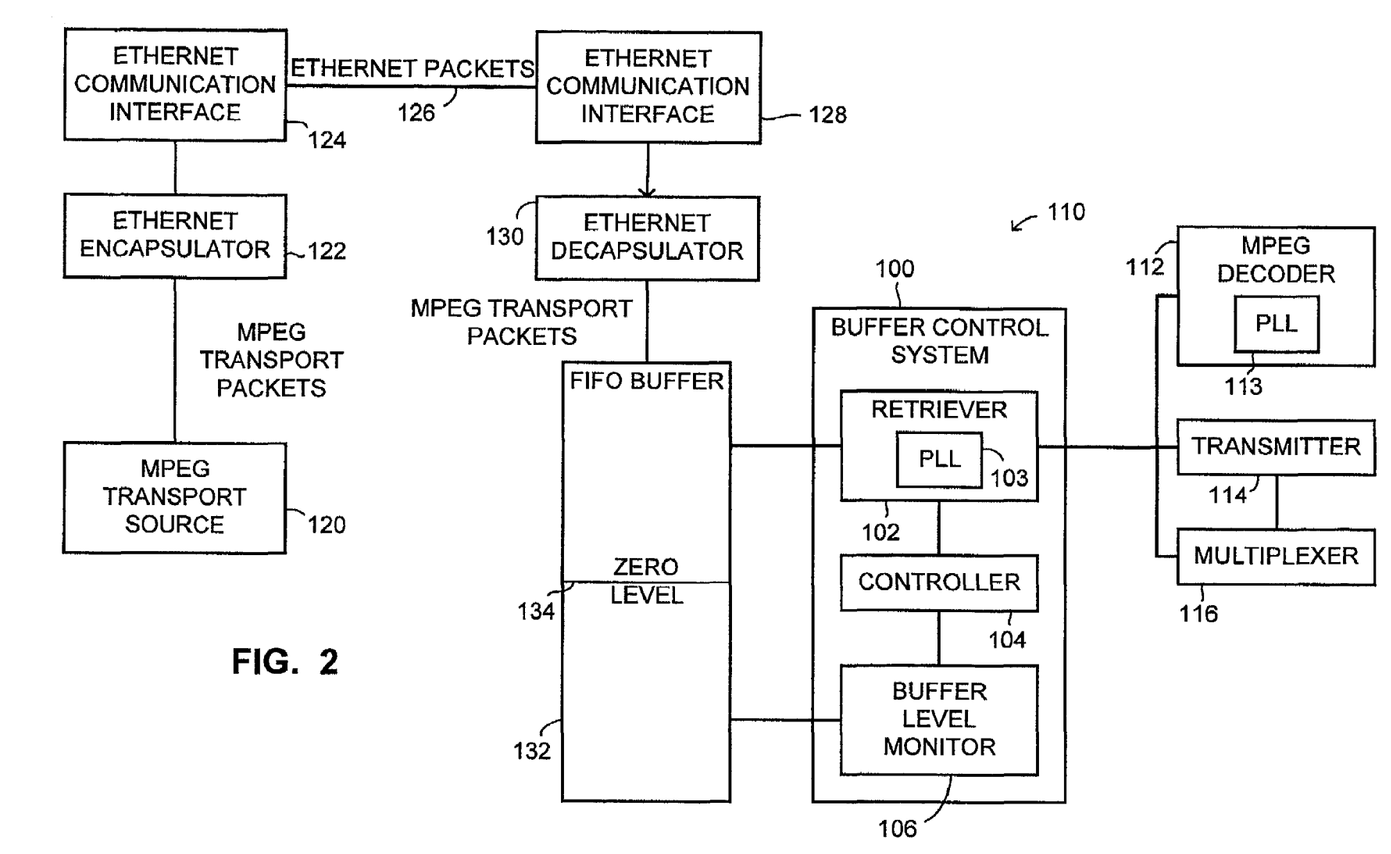
FIG. 2 is a schematic illustration of a communication system for transmitting time restricted data over bursty variable bit-rate communication channels, incorporating a buffer control system, constructed and operative in accordance with a preferred embodiment of the present invention.

Reference is now made to FIG. 2, which is a schematic illustration of a communication system, generally referenced 110, for transmitting time restricted data (e.g., MPEG transport packets) over bursty, non-predictable rate communication channels (e.g., Ethernet), incorporating a buffer control system, generally referenced 100, constructed and operative in accordance with a preferred embodiment of the present invention. Buffer control system 100 includes a retriever 102, a controller 104 and a buffer level monitor 106. Controller 104 is connected to buffer level monitor 106 and to retriever 102. Retriever 102 incorporates a PLL 103.

In the example set forth in FIG. 2, the system is configured to communicate over an Ethernet communication channel (i.e., a bursty communication channel), and employs an MPEG Transport source, as the time restricted data source. The disclosed technique can be configured for use with a plurality of transmission layer types and protocols, such as Ethernet, Fast Ethernet, Gigabit Ethernet, as well as higher level layers such as IP, TCP over IP, UDP, RTP over UDP, and the like. The time-restricted data can be in the form of MPEG Transport packets, and the like.

Communication system 110 includes an MPEG transport source 120, an Ethernet encapsulator 122, a transmitter end Ethernet communication interface 124, a receiver end Ethernet communication interface 128, an Ethernet decapsulator 130, a FIFO buffer 132 and a retriever 102. The output signal of the communication system can be fed to an MPEG receiving unit, which is either an MPEG decoder 112, a transmitter 114 or a multiplexer 116. Decoder 102 incorporates a PLL 113. PLL 113 is conventionally restricted according to the MPEG transport specification.

In general, an MPEG receiving unit such as MPEG decoder 112, includes an internal PLL unit, which has to be restrictively synchronized with the PLL of the MPEG transport transmitter. Using a bursty communication channel in the chain of communication, induces delays which are beyond the synchronicity restrictions of the MPEG decoder PLL unit.

Ethernet encapsulator 122 is connected to MPEG transport source 120 and to transmitter end Ethernet communication interface 124. Ethernet decapsulator 130 is connected to receiver end Ethernet communication interface 128 and FIFO buffer 132. Retriever 102 is further connected to FIFO buffer 132. Transmitter end Ethernet communication interface 124 is connected to receiver end Ethernet communication interface 128 via an Ethernet communication line 126. Retriever 102 is connected to MPEG decoder 112, transmitter 114 or to multiplexer 116. MPEG decoder 112 is connected to a display unit (not shown). It is noted that although in the above example, the MPEG transport data is conveyed over an Ethernet communication channel, the preferred embodiment can be made to convey MPEG transport data over any type of unpredictable rate communication channel.

Ethernet encapsulator 122 receives MPEG transport packages from MPEG transport source 120, encapsulates them in Ethernet packets and provides them to transmitter end Ethernet communication interface 124. Transmitter end Ethernet interface 124 transmits the Ethernet packets to receiver end Ethernet communication interface 128 via Ethernet communication line 126. Receiver end Ethernet communication interface 128 provides the received Ethernet packets to Ethernet decapsulator 130, which in turn extracts the MPEG transport packets embedded therein and stores them in FIFO buffer 132. Retriever 102 retrieves MPEG transport packets from FIFO buffer 132 at a rate, which is determined by controller 104. Buffer level monitor 106 monitors the volume of MPEG transport packets stored in FIFO buffer 132, and determines the currently measured buffer level value with respect to the total storage volume of FIFO buffer 132. The representation of the used storage area can be in terms of a buffer level, which either rises, when the used storage area increases, or drops when the used storage area decreases.

Buffer level monitor 106 monitors the level of the momentary used storage area, within FIFO buffer 132, and provides a buffer level value representing the size of that used storage area, to controller 104. The buffer level value can be presented in absolute numbers or relative to a predetermined zero level. In the example set forth in FIG. 2, buffer level monitor 106 can determine a threshold level, such as but not limited to, zero level (referenced 134) indicating the half fullness point of FIFO buffer 132. It is noted that the zero level can be determined elsewhere, depending on the behavior of the system. For example, for a system, which is more likely to fill the FIFO buffer rapidly, the zero level can be set at a lower point. Otherwise, for a system, which is more likely to drain the FIFO buffer, the zero level can be set at a higher point. Alternatively, the zero level can be set dynamically, according to the monitored behavior pattern of the used storage space within the FIFO buffer, over long periods of time, and according to a statistical measurement of the rate of the communication line in use.

Controller 104 controls the rate at which retriever 102 retrieves MPEG transport packets from FIFO buffer 132. In general, when the FIFO buffer level exceeds the zero level 134, then controller 104 sets retriever 102 to increase the MPEG transport packet retrieval rate. Similarly, when the FIFO buffer level falls below the zero level 134, then controller 104 sets retriever 102 to decrease the MPEG transport packet retrieval rate.

Every time an Ethernet packet is received, several MPEG transport packets are added to the buffer and so, the buffer level may exhibit small fluctuations at all times, while the average buffer level may not change at all, or change very slowly. Hence, the retrieval rate does not require immediate changes, due to statistical nature of these fluctuations. According to another preferred embodiment of the invention, the controller 104 sets the retrieval rate progressively. In most cases, a slight drift of the buffer level slightly from zero level 134, shall not result in any change in the retrieval rate. In case of a significant drift of the buffer level from zero level 134, controller 104 may set a change in the retrieval rate, which is directed at smoothly eliminating that drift, so as to avoid a jittered output stream at the output of the system. The following is a simple example of a function for setting the retrieval rate R:

$$|\Delta R| \begin{cases} = 0, & \Delta L \leq L_{THRESHOLD} \\ \infty \sqrt[n]{|CURRENT\_LEVEL - ZERO\_LEVEL|}, & \Delta L > L_{THRESHOLD} \end{cases}$$

wherein $\Delta L$ denotes the difference between the currently measured buffer level and the zero level, $L_{THRESHOLD}$ denotes a threshold buffer level, beyond which, the controller updates the retrieval rate R and n is a positive integer, greater than one.

$$R_{CURRENT\_LEVEL} = R_{ZERO\_LEVEL} + \text{whatisthesign} R$$

wherein $R_{CURRENT\_LEVEL}$ denotes the current retrieval rate, $R_{ZERO\_LEVEL}$ denotes the default retrieval rate at zero level 134, $\Delta R$ denotes the difference between $R_{CURRENT\_LEVEL}$ and $R_{ZERO\_LEVEL}$.

It is noted that the above equations do not apply for extreme situations such as the beginning of a video clip or the end thereof, a disconnection situation, and the like. For example, when the video clip ends, the FIFO buffer empties but the system maintains the former retrieval rate.

Retriever 102 retrieves MPEG packets from FIFO buffer 132 and sends them to either MPEG decoder 112, transmitter 114 or to multiplexer 116. Retriever 102 can send the MPEG packets to MPEG decoder 112, in which case MPEG decoder 112 decodes the MPEG packets, produces a plurality of elementary streams (e.g., video, audio, and the like) in a presentation format (e.g., PAL, NTSC, VGA, and the like) and provides these elementary streams to a presentation unit (e.g., a display unit, a television set, and the like). Alternatively, retriever 102 can send the MPEG packets to transmitter 114, in which case transmitter 114 transmits them to a remote receiver (not shown). Further alternatively, retriever 102 can send the MPEG packets to multiplexer 116 for multiplexing. Multiplexer 116 sends the multiplexed MPEG packets to transmitter 114, which in turn transmits the multiplexed MPEG packets to a remote receiver.

The difference between internal PLL unit of retriever 102 and the internal PLL unit of MPEG decoder 112 lies in the restrictions applied thereon. The PLL unit of MPEG decoder 112 is configured for significantly small jitter values of no more than 30 parts per million (ppm), which accordingly, is not suitable for a bursty supply of MPEG packets. The PLL unit of retriever 102 is configured for substantial jitter values, which characterize the bursty nature of the communication channel.

Figure 3:
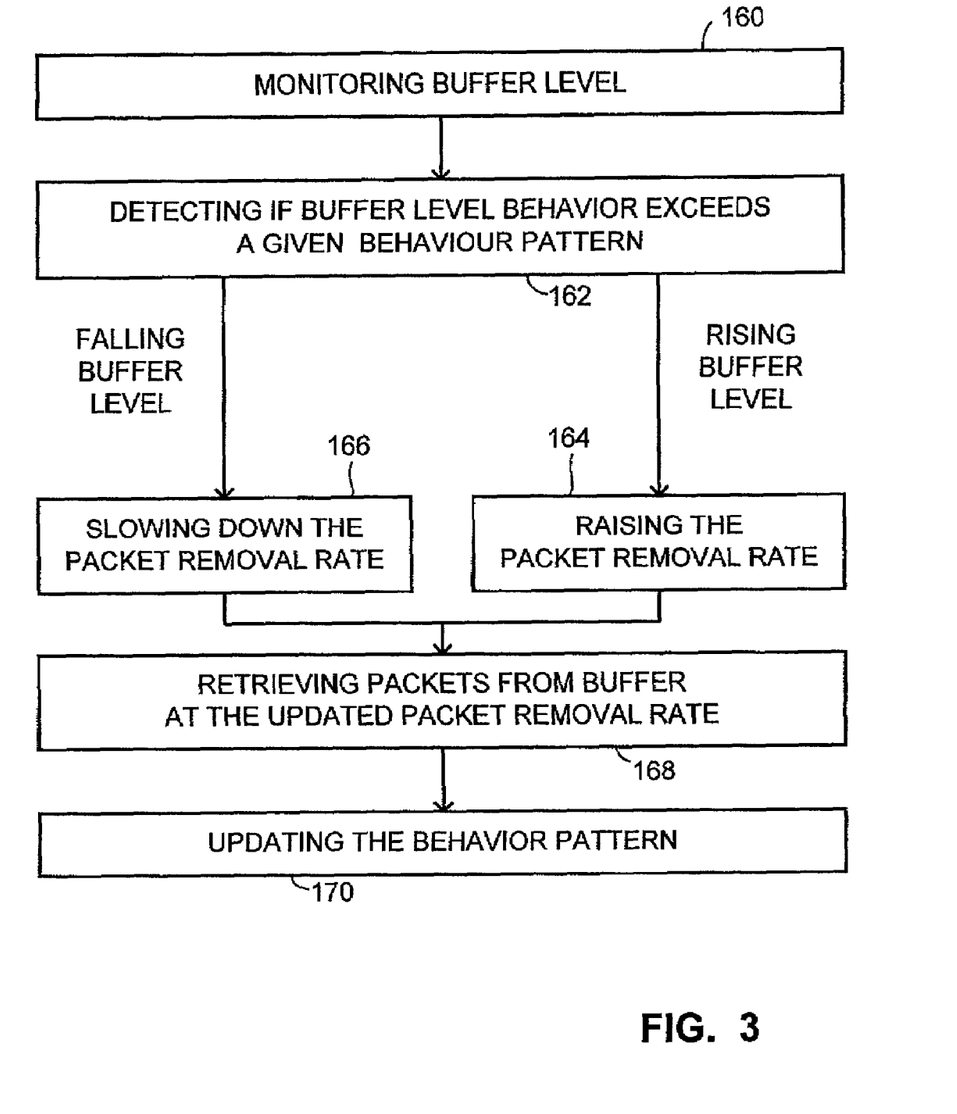
FIG. 3 is a schematic illustration of a method for operating the system of FIG. 2, operative in accordance with another preferred embodiment of the present invention.

Reference is now made to FIG. 3, which is a schematic illustration of a method for operating system 100 of FIG. 2, operative in accordance with another preferred embodiment of the present invention. In step 160, the buffer level is monitored. With reference to FIG. 2, buffer level monitor 106 monitors the currently used storage area within FIFO buffer 132. In step 162, the buffer level behavior is detected to determine if it complies with a given behavior pattern. It the buffer behavior diverts from that behavior pattern, then the method proceeds to step 164, when the buffer level exhibits a generally rising pattern and to step 166, when the buffer level exhibits a generally falling pattern. With reference to FIG. 2, controller 104 analyzes the behavior of the buffer level, according to the readings provided thereto by buffer level monitor 106.

In step 164, the packet retrieval rate is sped-up (increased), thereby adapting to a statistically increased buffer level. In step 166, the packet retrieval rate is slowed-down (decreased), thereby adapting to a statistically decreased buffer level. With reference to FIG. 2, controller 104 sets retriever 102 to a new packet retrieval rate, either increased or decreased.

In step 168, packets are retrieved at the currently updated packet removal rate. With reference to FIG. 2, retriever 102 retrieves MPEG transport packets from FIFO buffer 132, at the currently updated retrieval rate.

In step 170, the behavior pattern is updated. This step is performed when the system detects a substantial change in the behavior of the used storage area within the FIFO buffer, which indicates a respective change in one of the links in the chain of information conveyance from the Ethernet encapsulator 122 through communication channel 126 up until the FIFO buffer 132.

Figure 4:
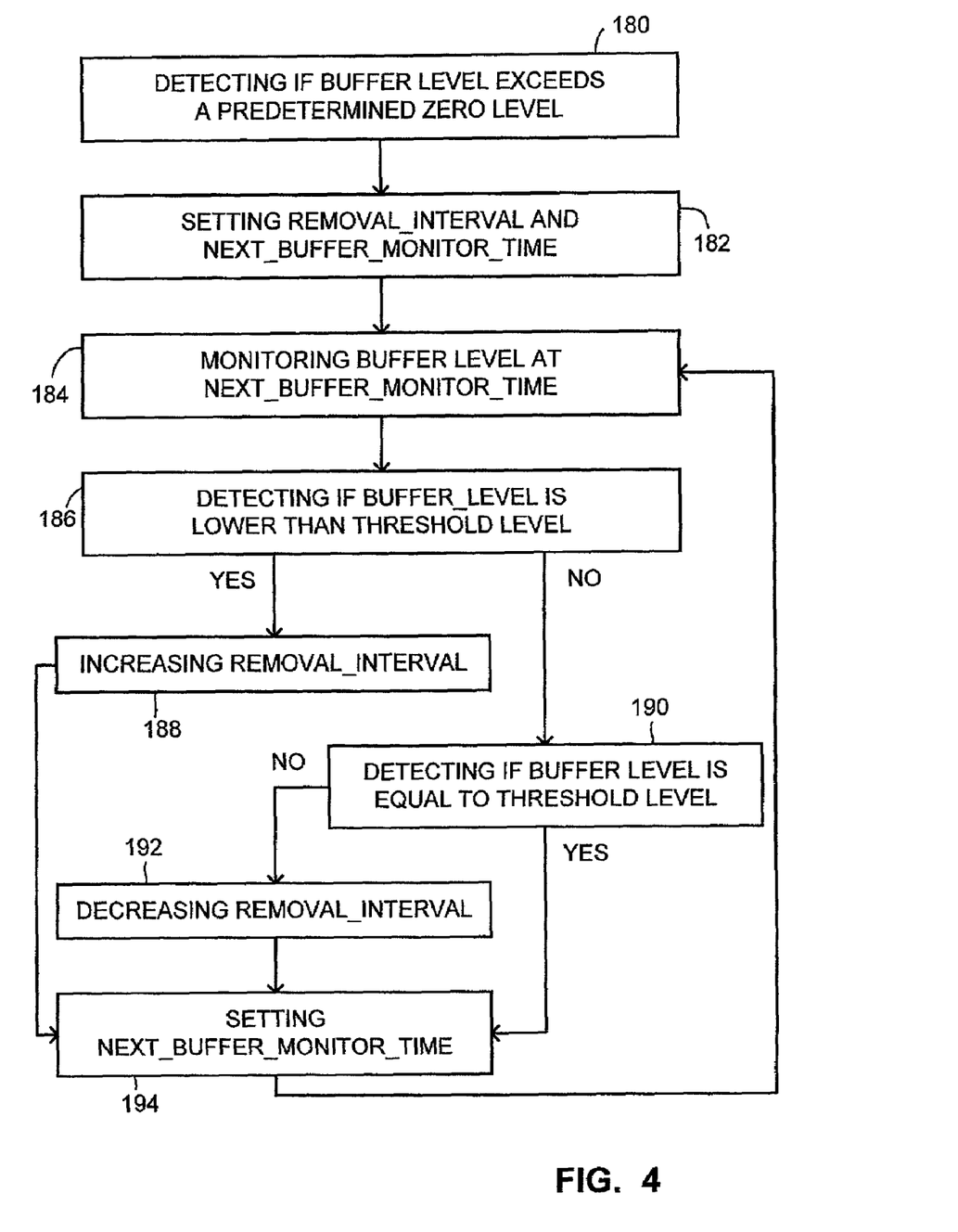
FIG. 4 is a schematic illustration of a method for monitoring and controlling the packet retrieval rate from a buffer, operative in accordance with a further preferred embodiment of the invention.

Reference is now made to FIG. 4, which is a schematic illustration of a method for monitoring and controlling the packet retrieval rate from a buffer, operative in accordance with a further preferred embodiment of the invention. It is noted that the method of FIG. 4 is merely a simple example for such a method. The following are definitions used throughout the description of the method of FIG. 4:

REMOVAL_INTERVAL is the estimated time between the desired arrival times of two successive packets, at the MPEG decoder. Initially this parameter can be set to any value. According to one aspect of the invention, this parameter is set according to the bit-rate of the stream, which is a value that can be set by the transmitter 124, prior to transmission. It is noted that this value can also be set by Ethernet encapsulator 122.

NEXT_BUFFER_MONITOR_TIME denotes the next time the buffer will be monitored. According to this embodiment, the buffer is not monitored continuously, rather at intervals, which are subject to change, according to the behavior of the system. In general, this parameter can be set to any value, which takes into account the communication channel bit-rate fluctuations and bursty behavior. As stated above, the communication channel (i.e., Ethernet) is characterized by a bursty behavior. If the buffer level is monitored too often, then the reading may be affected by that bursty behavior. Hence, it is desirable to set this parameter to a value that diminishes the influence of such bursty behavior (i.e., a high value, which defines a significant interval between two subsequent monitoring events). Alternatively, the NEXT_BUFFER_MONITOR_TIME parameter can be set to a small value, in which case, controller 104 calculates statistical values (e.g., mean value, progressive weighted value, and the like) from several recent buffer level readings and uses these statistical values instead of just the recent buffer level reading.

In step 180, the system detects if buffer level exceeded a predetermined zero level. With reference to FIG. 2, after initialization, the controller 104 waits until FIFO buffer 132 fills up to a predetermined zero level 134. At this stage, REMOVAL_INTERVAL and NEXT_BUFFER_MONITOR_TIME are set to their initial values (step 182).

In step 184, the buffer level is monitored at NEXT_BUFFER_MONITOR_TIME. With reference to FIG. 2, buffer level monitor 106 reads the current buffer level and provides that reading to controller 104.

In step 186, if the buffer level is lower than a threshold level, then the system proceeds to step 188. Otherwise, the system proceeds to step 190. It is noted that as stated above, controller 104 can either use the received buffer level value or a value, which is derived from the recent buffer level readings. It is noted that the zero level can be either different or equal to the threshold level.

In step 188, the value of REMOVAL_INTERVAL is increased and the method proceeds to step 194. This value reflects a slower rate of removing packets from the buffer. With reference to FIG. 2, controller 104 increases the value of REMOVAL_INTERVAL and updates retriever 102 accordingly.

In step 190, if the buffer level is equal to the threshold level, then the system proceeds to step 194. Otherwise, the system proceeds to step 192. In step 192, the value of REMOVAL_INTERVAL is decreased. This new value reflects a faster rate of removing packets from the buffer. With reference to FIG. 2, controller 104 decreases the value of REMOVAL_INTERVAL and updates retriever 102 accordingly.

In step 194 NEXT_BUFFER_MONITOR_TIME is set to a new value, according to the action that took place beforehand (i.e., increasing, decreasing or leaving the value of REMOVAL_INTERVAL unchanged). When the value of REMOVAL_INTERVAL is increased, then the retrieval rate from the buffer slows down and less packets are retrieved on the average, in a given time period such as the buffer monitoring interval. In order to maintain a constant average number of packets, the system can increase the buffer monitoring interval. At this point, the method proceeds back from step 184. With reference to FIG. 2, controller 104 sets a new value to NEXT_BUFFER_MONITOR_TIME and updates retriever 102 accordingly. It is noted that a new value for NEXT_BUFFER_MONITOR_TIME may be calculated by taking into account the present value of REMOVAL_INTERVAL.

The values for setting REMOVAL_INTERVAL, NEXT_BUFFER_MONITOR_TIME and the threshold level are mainly determined as a function of communication channel characteristics, with further reference to the specific situation imposed by other factors in the system. For example, when the system detects that the jitter in the rate of communication is small, it can set the interval between subsequent monitoring events to be small, accordingly (i.e., decreasing NEXT_BUFFER_MONITOR_TIME). Alternatively, if the jitter is known to be large, then the system may apply a low pass filter on the buffer level readings, which shall eventually result in an increase of the intervals between subsequent monitoring events (i.e., increasing NEXT_BUFFER_MONITOR_TIME).

The following is a specific example, for transmitting MPEG transport packets over Ethernet using combined Microsoft Windows and Intel PC architecture. In this example, transmitting video over Ethernet on this architecture allows a jitter of ±10 ms ($10*10^{-3}$ seconds). Accordingly, an MPEG transport packet may arrive up to 10 ms earlier or later than its desired arrival time. Hence, the end-to-end burst is limited to 20 ms. Accordingly, the buffer should always include enough packets for a transmitting time period of 20 ms. The size of an Ethernet packet is limited to 1536 bytes. An MPEG Transport packet is limited to 188 bytes. Hence, an Ethernet packet can include up to 7 Transport packets, along with its own Ethernet headers and additional data. The term additional data refers to information which allows sufficient use of the Ethernet packet, such as an indication of null MPEG transport packets, without including these null packets in the Ethernet packet, data relating to the video content such as the name of the video clip, the makers thereof, and the like.

If the declared bit-rate of the MPEG Transport stream is 4 Mb/second (Mbps), then a 20 ms buffer holds 54 MPEG Transport packets. Accordingly, the threshold level is set at 80 MPEG Transport packets (54 plus some more space for processing and robustness). NEXT_BUFFER_MONITOR_TIME is set to 128 times REMOVAL_INTERVAL indicating that the buffer is monitored every 128 MPEG Transport packets. REMOVAL_INTERVAL is set to 376 microseconds, which is the interval between two successive MPEG Transport packets at 4 Mbps. If after NEXT_BUFFER_MONITOR_TIME the number of packets in the buffer is less than 53 (=80−54/2), REMOVAL_INTERVAL is increased by 1 microsecond. If there are more than 107 (=80+54/2) packets in the buffer, REMOVAL_INTERVAL is reduced by 1 microsecond. In both cases, NEXT_BUFFER_MONITOR_TIME is recalculated using the new values for REMOVAL_INTERVAL.

It is noted that a high threshold level, results in a significant delay in starting the process, until the FIFO buffer fills up to that level. Different methods for determining the value of REMOVAL_INTERVAL and NEXT_BUFFER_MONITOR_TIME may affect the convergence of the system.

Figure 5:
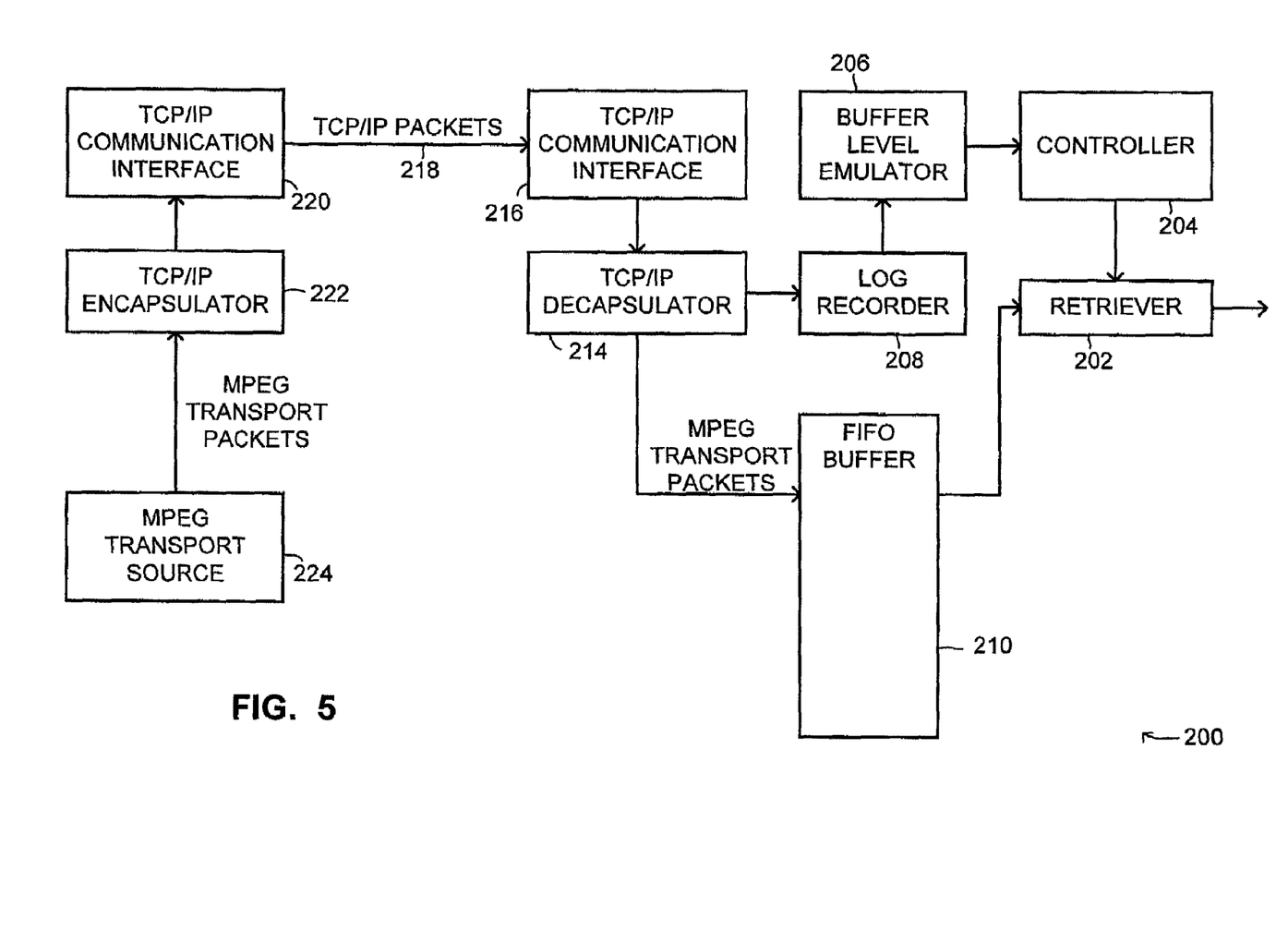
FIG. 5 is a schematic illustration of a communication system for transmitting MPEG transport data over bursty variable bit-rate communication channels, constructed and operative in accordance with another preferred embodiment of the present invention.

Reference is now made to FIG. 5, which is a schematic illustration of a communication system, generally referenced 200, for transmitting MPEG Transport data over non-predictable rate communication channels, constructed and operative in accordance with another preferred embodiment of the present invention. Communication system 200 includes a retriever 202, a controller 204, a buffer level emulator 206, a log recorder 208, an MPEG Transport source 224, a TCP/IP encapsulator 222, a transmitter end TCP/IP communication interface 220, a receiver end TCP/IP communication interface 216, a TCP/IP decapsulator 214 and a FIFO buffer 210.

Controller 204 is connected to buffer level emulator 206 and to retriever 202. Log recorder 208 is further connected to buffer level emulator 206 and to TCP/IP decapsulator 214. TCP/IP encapsulator 222 is connected to MPEG Transport source 224 and to transmitter end TCP/IP communication interface 220. TCP/IP decapsulator 214 is connected to receiver end TCP/IP communication interface 216 and to FIFO buffer 210. Retriever 202 is further connected to FIFO buffer 210. Transmitter end TCP/IP communication interface 220 is connected to receiver end TCP/IP communication interface 216 via a TCP/IP communication line 218.

TCP/IP encapsulator 222 receives MPEG Transport packages from MPEG Transport source 224, encapsulates them in TCP/IP packets and provides them to transmitter end TCP/IP communication interface 220. TCP/IP encapsulator 222 replaces MPEG Transport null packets with respective indication within the generated TCP/IP packets, thereby saving bandwidth. Transmitter end TCP/IP interface 220 transmits the TCP/IP packets to receiver end TCP/IP communication interface 216 via TCP/IP communication line 218. Receiver end TCP/IP communication interface 216 provides the received TCP/IP packets to TCP/IP decapsulator 214, which in turn extracts the MPEG Transport packets embedded therein as well as additional information (e.g., null packet indications). TCP/IP decapsulator 214 stores the MPEG Transport packets in FIFO buffer 210 and at the same time provides information related to these MPEG Transport packets to log recorder 208. Log recorder 208 logs the received information in a log file. Buffer level emulator 206 processes the log file, emulates the behavior of FIFO buffer 210 and provides an emulated buffer level reading to controller 204.

Controller 204 controls the rate at which retriever 202 retrieves MPEG Transport packets from FIFO buffer 210. When the emulated FIFO buffer level exceeds a threshold level, then controller 204 sets retriever 202 to increase the MPEG Transport packet retrieval rate. Similarly, when the FIFO buffer level falls below the threshold level, then controller 204 sets retriever 202 to decrease the MPEG Transport packet retrieval rate.

Figure 6:
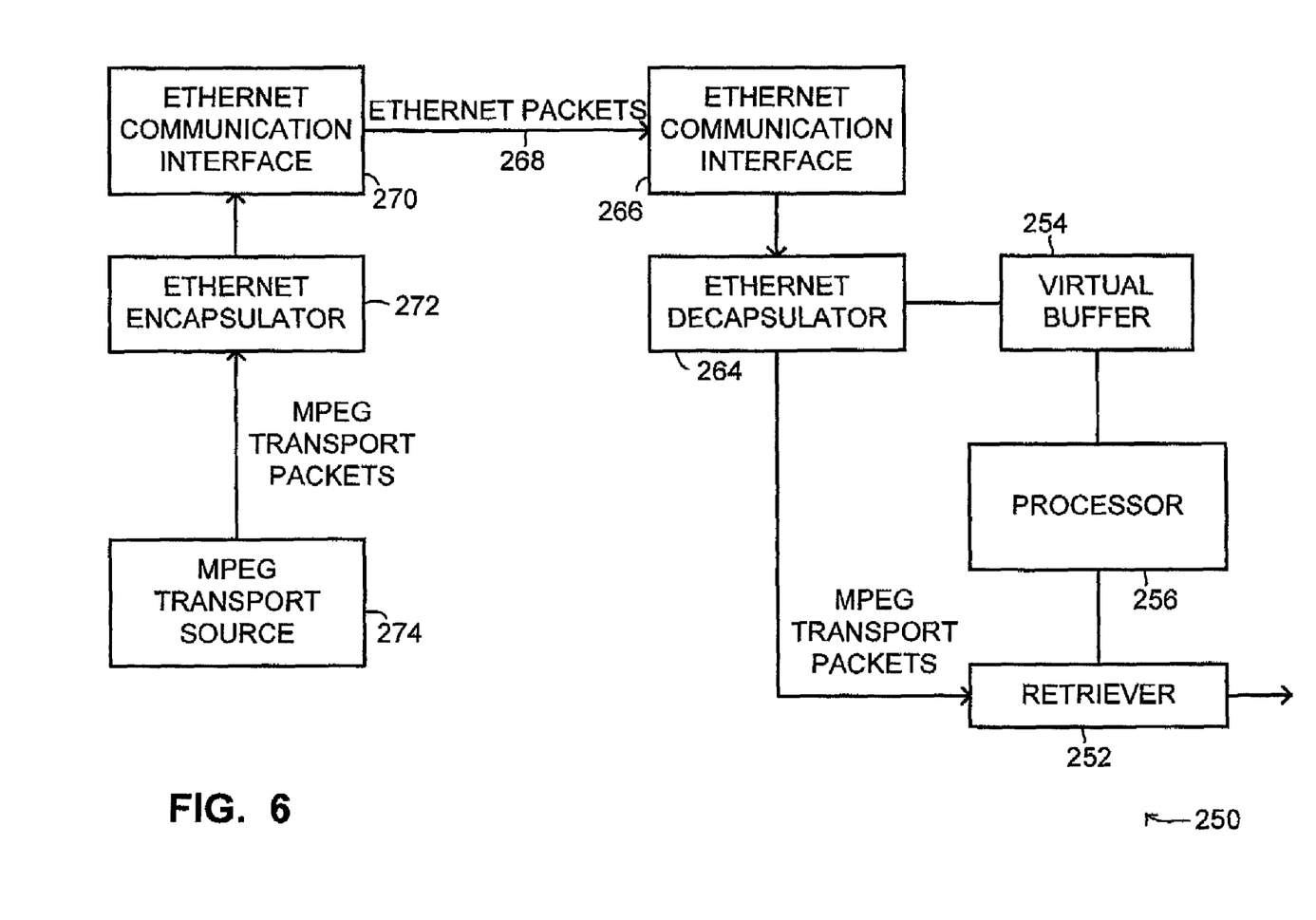
FIG. 6 is a schematic illustration of a communication system for transmitting MPEG Transport data over non-predictable rate communication channels, constructed and operative in accordance with a further preferred embodiment of the present invention.

The disclosed technique provides additional embodiments, which do not include any FIFO buffer, such as buffers 132 (FIG. 2) and 210 (FIG. 5), but include a virtual buffer. Reference is now made to FIG. 6, which is a schematic illustration of a communication system, generally referenced 250, for transmitting MPEG Transport data over non-predictable rate communication channels, constructed and operative in accordance with a further preferred embodiment of the present invention. Communication system 250 includes a retriever 252, a processor 256, a virtual buffer 254, an MPEG Transport source 274, an Ethernet encapsulator 272, a transmitter end Ethernet communication interface 270, a receiver end Ethernet communication interface 266 and an Ethernet decapsulator 264.

Processor 256 is connected to virtual buffer 254 and to retriever 252. Ethernet encapsulator 272 is connected to MPEG Transport source 274 and to transmitter end Ethernet communication interface 270. Ethernet decapsulator 264 further connected to receiver end Ethernet communication interface 266 and to virtual buffer 254. Retriever 252 is further connected to Ethernet decapsulator 264. Transmitter end Ethernet communication interface 270 is connected to receiver end Ethernet communication interface 266 via an Ethernet communication line 268.

Ethernet encapsulator 272 receives MPEG Transport packages from MPEG Transport source 274, encapsulates them in Ethernet packets and provides them to transmitter end Ethernet communication interface 270. Ethernet encapsulator 272 replaces MPEG Transport null packets with respective indication within the generated Ethernet packets, thereby saving bandwidth. Transmitter end Ethernet communication interface 270 transmits the Ethernet packets to receiver end Ethernet communication interface 266 via Ethernet communication line 268. Receiver end Ethernet communication interface 266 provides the received Ethernet packets to Ethernet decapsulator 264, which in turn extracts the MPEG Transport packets embedded therein as well as additional information (e.g., null packet indications). Ethernet decapsulator 264 provides all of the information regarding received MPEG Transport packets to virtual buffer 254, but not the actual received MPEG Transport packets. Virtual buffer 254 counts the received MPEG Transport packets and produces an emulated buffer level, which indicates a virtual buffer level, had the system had such a FIFO buffer.

Retriever 252 retrieves the received MPEG Transport packets from Ethernet decapsulator 264. Processor 256 controls the rate at which retriever 252 retrieves MPEG Transport packets from Ethernet decapsulator 264.

The system may be initialized according to the theoretical parameters, which are adjusted according to the behavior of virtual buffer 254. For example, if the expected initial incoming rate is estimated at 4 Mbps, then retriever 252 can be set for retrieving packets from Ethernet decapsulator 264 at a rate of 4.000015 Mbps. The difference between the theoretical rate of 4 Mbps and the actual rate of 4.000015 Mbps is higher than the allowed difference between the clock of the transmitting end and the clock of the receiving end. Processor 256 determines the theoretical retrieval time (i.e., instead of the actual retrieval time) and adjusts the retrieval rate of retriever 252, thereby synchronizing the clock of the receiving end with the clock of the transmitting end.

It will be appreciated by persons skilled in the art that the present invention is not limited to what has been particularly shown and described hereinabove. Rather the scope of the present invention is defined only by the claims, which follow.

The invention claimed is:

1. A system for compensating for timing violations of time restricted data being transmitted over a bursty communication channel, the system comprising:
   a retriever, coupled to a buffer, for retrieving the time restricted data from the buffer, at a retrieval rate;
   a buffer level monitor, coupled to the buffer, for monitoring the level of time restricted data in the buffer at a monitoring rate; and
   a controller coupled to the buffer level monitor and to the retriever, for setting the retrieval rate and the monitoring rate; wherein the retrieval rate and the monitoring rate are responsive to low frequency changes in the level of time restricted data in the buffer.

2. The system according to claim 1, wherein the controller sets the retrieval rate and the monitoring rate, according to the level of the time restricted data in the buffer.

3. The system according to claim 1, wherein the retrieval rate is increased when the difference between the level of the time restricted data in the buffer and a predefined threshold level exceeds a predefined difference threshold.

4. The system according to claim 1, wherein the retrieval rate being responsive to the difference between the level of the time restricted data in the buffer and a predefined threshold level.

5. The system of claim 1, wherein the controller is configured to change the monitoring rate and the retrieval rate to compensate for jitter included in the time-restricted data.

6. The system of claim 1, wherein the removal interval is responsive to a current bit rate of the time restricted data.

7. The system of claim 1, wherein the controller sets the monitoring rate in response to the level of jitter included in the time restricted data.

8. The system of claim 1, wherein the monitoring rate and the retrieval rate are set in view of a statistical analysis of the level of time restricted data in the buffer.

9. The system of claim 1, wherein the controller is configured to set the monitoring rate in response to changes in the bit rate of arriving time-restricted data.

10. The system according to claim 1, wherein the controller modifies the retrieval rate, when said controller detects that the behavior of said current level exceeds a given behavior and adjusts said retrieval rate accordingly.

11. The system according to claim 1, wherein said buffer is a first in first out buffer.

12. The system according to claim 1, wherein the time restricted data is in a form of MPEG Transport packet.

13. The system according to claim 1, wherein the type of said bursty communication channel is selected from the list consisting of:
Ethernet;
Fast Ethernet;
Gigabit Ethernet;
TCP/IP;
RTP; and
UDP/IP.

14. The system of claim 1, wherein the timing violations are selected from the group consisting of:
delay; and
Jitter.

15. A system for transferring time restricted data over a jitter including channel, the system comprising:
a retriever, coupled to a buffer, for retrieving the time restricted data from the buffer, at a retrieval rate;
a buffer level monitor, coupled to the buffer, for monitoring the level of time restricted data in the buffer at a monitoring rate; and
a controller coupled to the buffer level monitor and to the retriever, for setting the retrieval rate and the monitoring rate; wherein the retrieval rate and the monitoring rate are responsive to low frequency changes in the level of time restricted data in the buffer.

16. A Method for controlling a buffer containing time restricted data received over a bursty communication channel, the method comprising the steps of:
setting a time interval between sequential retrievals of time restricted data from a buffer and a monitoring time at which the buffer level of said time restricted data in said buffer is to be monitored; wherein the retrieval rate and the monitoring rate are responsive to low frequency changes in the level of time restricted data in the buffer;
monitoring said buffer level at said monitoring time;
increasing said interval when said buffer level is lower than an upper threshold; and
decreasing said interval when said buffer level is lower than a lower threshold.

* * * * *